*INVENTOR.*
HORST WOGATZKE

ATTORNEY.

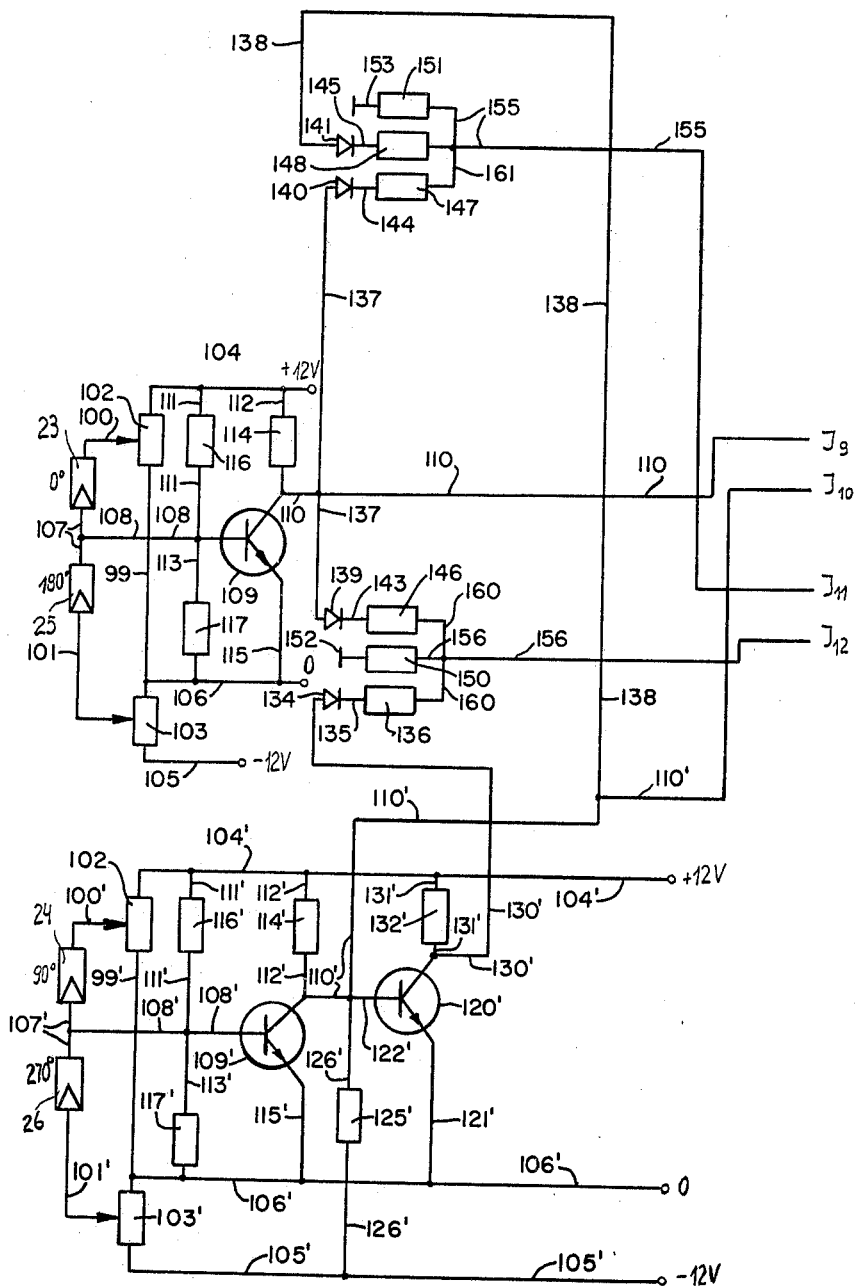

United States Patent Office 3,487,399
Patented Dec. 30, 1969

3,487,399
APPARATUS FOR MEASURING OF LENGTHS BY MEANS OF IMPULSE COUNTING
Horst Wogatzke, Dusseldorf-Grafenberg, Germany, assignor to Firma Wenczler & Heidenhain, Traunreut/ Obb., near Traunstein, Germany, a corporation of Germany
Filed Apr. 12, 1965, Ser. No. 447,458
Claims priority, application Germany, Apr. 11, 1964, W 36,562
Int. Cl. H04l 3/00; G06f 7/38; G06g 7/00
U.S. Cl. 340—347                           4 Claims

ABSTRACT OF THE DISCLOSURE

A system for measuring of straightaways and divisions of circles, wherein the displacement of a division relative to a reading device for a multiple of the division occurs, whereby impulse rows are formed displaced by a phase-angle different from 0° and 180° relative to each other, and the value in size and direction to be measured being determined by impulse counting, comprising means for forming from impulse rows an electrical summary signal, as well as a difference signal, feeding the signals to pulse shaper stages, and feeding the outputs of the pulse shaper stages to a direction discriminator device and to a counting circuit.

---

The present invention relates to an apparatus for measuring of lengths by means of impulse counting, and in particular for measuring of straightaways and divisions of circles, wherein the displacement of one division relative to a reading device takes place for a full-numbered or not full-numbered multiple of this division, whereby impulse rows are formed which are set off relative to each other for a phase angle of 0° and 180° and the value to be measured as to its size and direction is determined by impulse counting.

In known devices of this type, it has been found as a drawback, that errors, as for instance inaccurate divisions, as well as inaccurately lined-up photo-elements, cause a phase displacement, as well as an amplitude deviation of the impulse rows. A permanent phase position as well as amplitude height are, however, a presumption for an exact measuring.

It is one object of the present invention to provide an apparatus for measuring of lengths by means of impulse counting, wherein an electrical summary signal, as well as a difference signal are formed from both impulse rows and these signals are fed to pulses shaper stages, the outputs of which are fed to a known direction discriminator and to a counting circuit.

With this and other objects in view, which will become apparent in the following detailed description, the present invention will be clearly understood in connection with the accompanying drawings, in which:

FIG. 7 is an electrical circuit pertaining to the section indicated as VII in FIG. 2 of the drawings.

Figure 1:
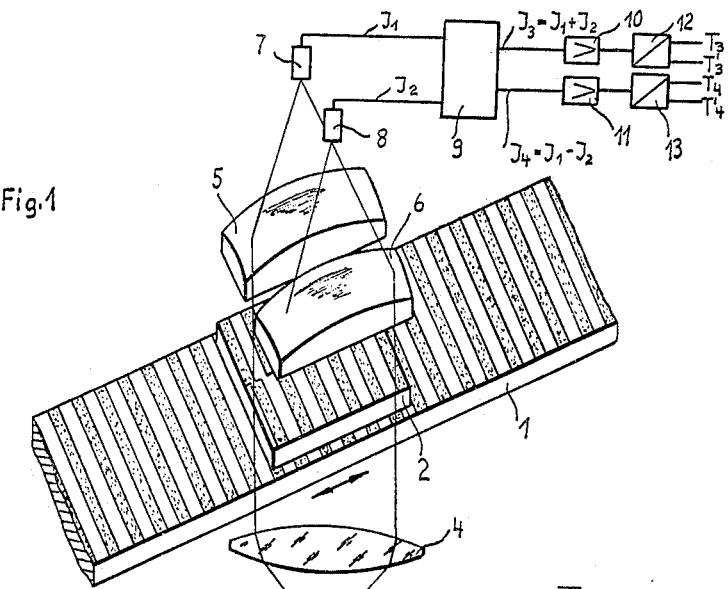
FIGURE 1 is a schematic perspective view showing the principle of the measuring device designed in accordance with the present invention, disclosed on an enlarged scale.

Referring now to the drawings, and in particular to FIG. 1, a light electric apparatus for measuring of lengths is disclosed. A grid module 1, as well as a line plate 2 are passed by a bundle of rays, which bundle of rays is formed by a lamp 3 and a condenser 4. The two halves of the bundle of rays impinge thereafter by means of two lenses 5 and 6 two photo-elements 7 and 8, which generate electrical output signals $I_1$ and $I_2$.

Due to the design of the line plate 2 in form of a line group set off relative to each other for one half of the line width, which is equal to ¼ of the grid constant, the signals $I_1$ and $I_2$ are phase-displaced relative to each other by 90°.

By means of known circuit arrangements, the prevailing position can now be determined by counting from these signals or impulse rows $I_1$ and $I_2$, whereby also the sense of direction is determined, due to the relative displacement by 90°.

The arrangement described so far and its operation is well known and does not require, therefore, further explanation.

Due to influences of different types, for instance inexact division, as well as inexactly lined-up photo-elements, a phase-displacement and amplitude variation, respectively, of the output signals $I_1$ and $I_2$ is possible. In order to avoid this, the signals $I_1$ and $I_2$ are fed to an electrical structure element 9, which forms from the signals $I_1$ and $I_2$ a summary signal $I_3(I_1+I_2)$, as well as a difference signal $I_4(I_1+I_2)$.

The signals $I_3$ and $I_4$ are fed to amplifiers 10 and 11 and thereafter to pulse shaper stages 12 and 13.

Figure 3:
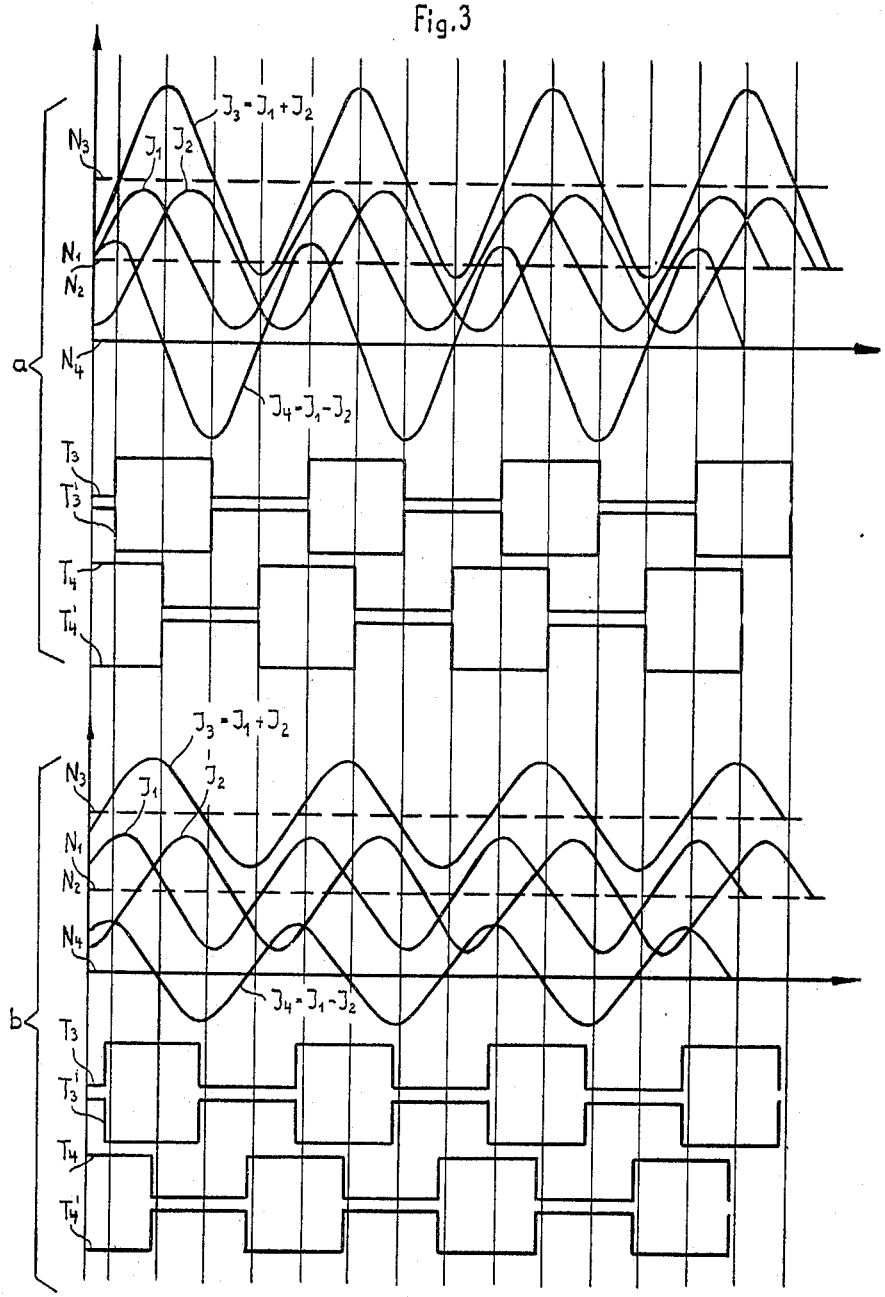
FIG. 3 depicts schematically electrical wave forms for the demonstration of the operation of the device disclosed in FIG. 1.

Referring now again to the drawings, and in particular to FIG. 3, a are the signals $I_1$ and $I_2$ displaced relative to each other for 90°, as well as the summary signal $I_3$ and difference signal $I_4$, respectively, formed thereof in dependency upon the path which has been passed. By the pulse shaper stages 12 and 13 (FIG. 1), which respond at the signal level $N_3$, $N_4$ (FIG. 3), the signals $I_3$ and $I_4$ are deformed into rectangular inpulse rows $T_3$ and $T_4$, as well as the corresponding inverse impulse rows $T'_3$ and $T'_4$.

Referring now to FIG. 3 of the drawings, b are the impulse rows $I_1$ and $I_2$ relative to a of FIG. 3 with another phase angle, as well as with a different amplitude height.

From the comparison of a and b of FIG. 3, it can be recognized that phase-angle errors, as well as changes of the amplitude height of the impulse rows $I_1$ and $I_2$ have then no influence on the phase position of the rectangular impulse rows $T_3$ and $T'_3$, as well as $T_4$ and $T'_4$, if the impulse rows $I_3$ and $I_4$ are formed by addition and subtraction, respectively, from the output signals $I_1$ and $I_2$.

The impulse rows $T_3$, $T'_3$ and $T_4$, $T'_4$, which for each division show four equal switch jumps, are fed to a known direction discriminator and counting circuit (not shown).

Figure 2:
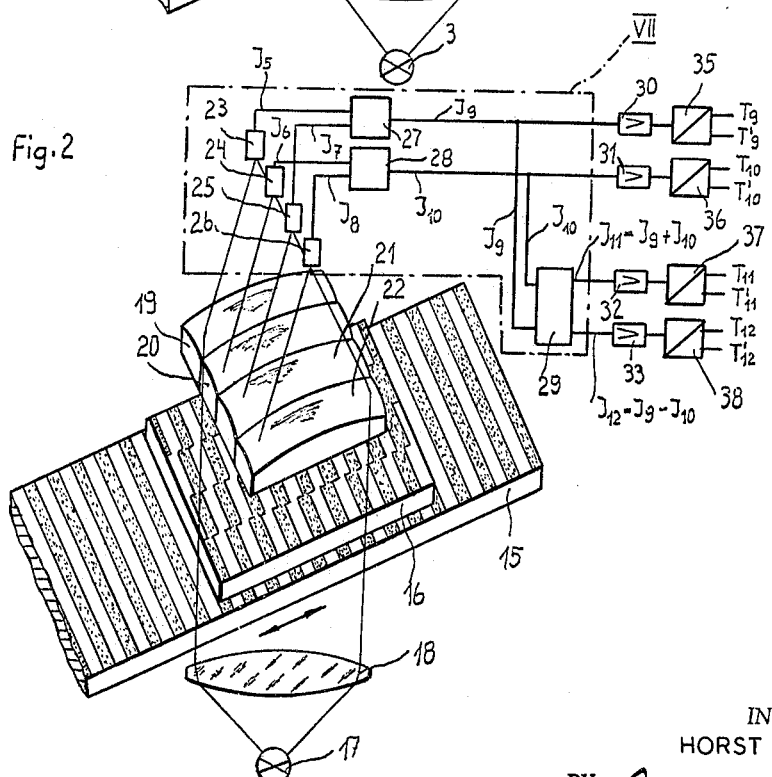
FIG. 2 is a schematic perspective view of another embodiment of the present invention, shown at an enlarged scale.

FIG. 2 discloses in principle a photo-electric apparatus for the measuring of lengths. A grid module 15, as well as a line-plate 16, the relative position to the module 15 to be measured, are passed by a bundle of rays, which is produced by a lamp 17 and a condenser 18. Thereafter, the bundle of rays passes through four lenses 19, 20, 21 and 22 to four photo-sensitive elements 23, 24, 25 and 26, which deliver electrical output signals $I_5$, $I_6$, $I_7$ and $I_8$.

The line plate 16 has four rows of divisions which are equal relative to each other and to the grid module 15.

The divisions of the line plate 16 are set off relative to each other for a half-line width, which is ¼ of the grid constant. In corresponding displacement, that is for 90°, the photo-elements 23, 24, 25 and 26 are arranged similarly, and the phase difference of the signals $I_5$, $I_6$, $I_7$ and $I_8$ is disposed in a counter-phase relative to each other in the first photo-cell 23 and the third photo-cell 25, as well as in the second photo-cell 24 and the fourth photo-cell 26. The output signals $I_5$ and $I_7$ of the photo-elements 23 and 25 are fed to the electrical switching element 27, which provides the signal $I_9$. The output signals $I_6$ and $I_8$ of the photo-elements 24 and 26 are fed to the electrical switching elements 28, which provide the signal $I_{10}$.

The arrangement described so far and its operation is known and is schematically disclosed in FIG. 2.

For economical and manufacturing reasons, respectively, it is of interest not to make the module divisions too small. The tendencies are, therefore, directed to obtain sufficiently small path quantities in spite of relatively coarsely divided modules.

The above-stated problem is solved in accordance with the present invention in the following manner. As it can be ascertained from FIG. 2, the two signals $I_9$ and $I_{10}$ are fed to an electrical element 29, which, in accordance with the present invention, forms the summary signal $$I_{11}(I_9+I_{10})$$

and the difference signal $I_{12}(I_9-I_{10})$ from the signals $I_9$ and $I_{10}$.

The signals $I_9$, $I_{10}$, $I_{11}$ and $I_{12}$ are fed to the amplifiers 30, 31, 32 and 33 and thereafter to the pulse shaper stages 35, 36, 37 and 38.

Figure 4:
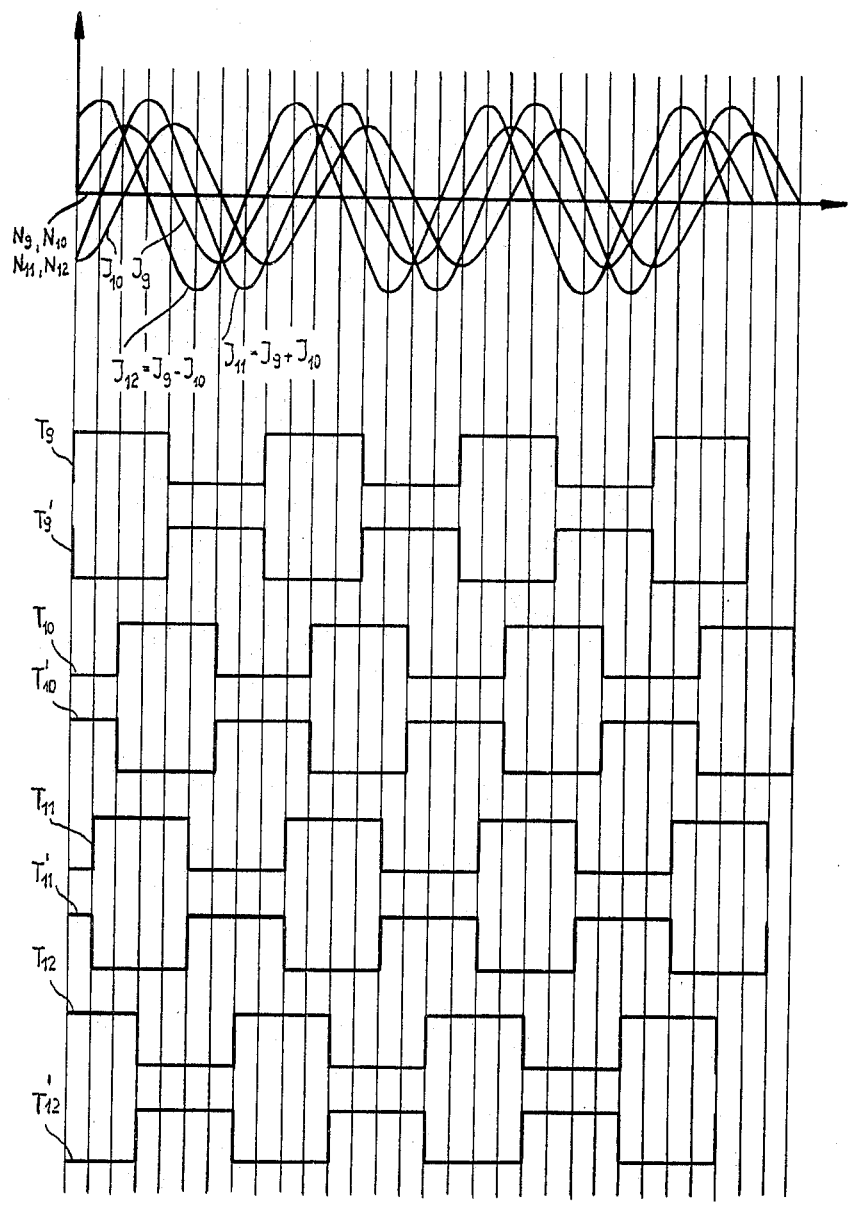
FIG. 4 depicts electrical wave forms for demonstration of the operation of the device disclosed in FIG. 2.

Referring now to FIG. 4, the signals $I_9$, $I_{10}$ set-off relative to each other for 90° and produced by means of the push-pull circuit, as well as the summary signal $I_{11}$ and the difference signal $I_{12}$, respectively, formed therefrom, are shown dependent upon the passed path.

The signals $I_9$, $I_{10}$, $I_{11}$ and $I_{12}$ are converted into rectangular impulse rows $T_9$, $T_{10}$, $T_{11}$ and $T_{12}$, as well as the corresponding inverse impulse rows $T'_9$, $T'_{10}$, $T'_{11}$ and $T'_{12}$ by the pulse shaper stages 35, 36, 37 and 38 (FIG. 2), which respond at the signal level $N_9$, $N_{10}$, $N_{11}$ and $N_{12}$ (FIG. 4).

Figure 5:
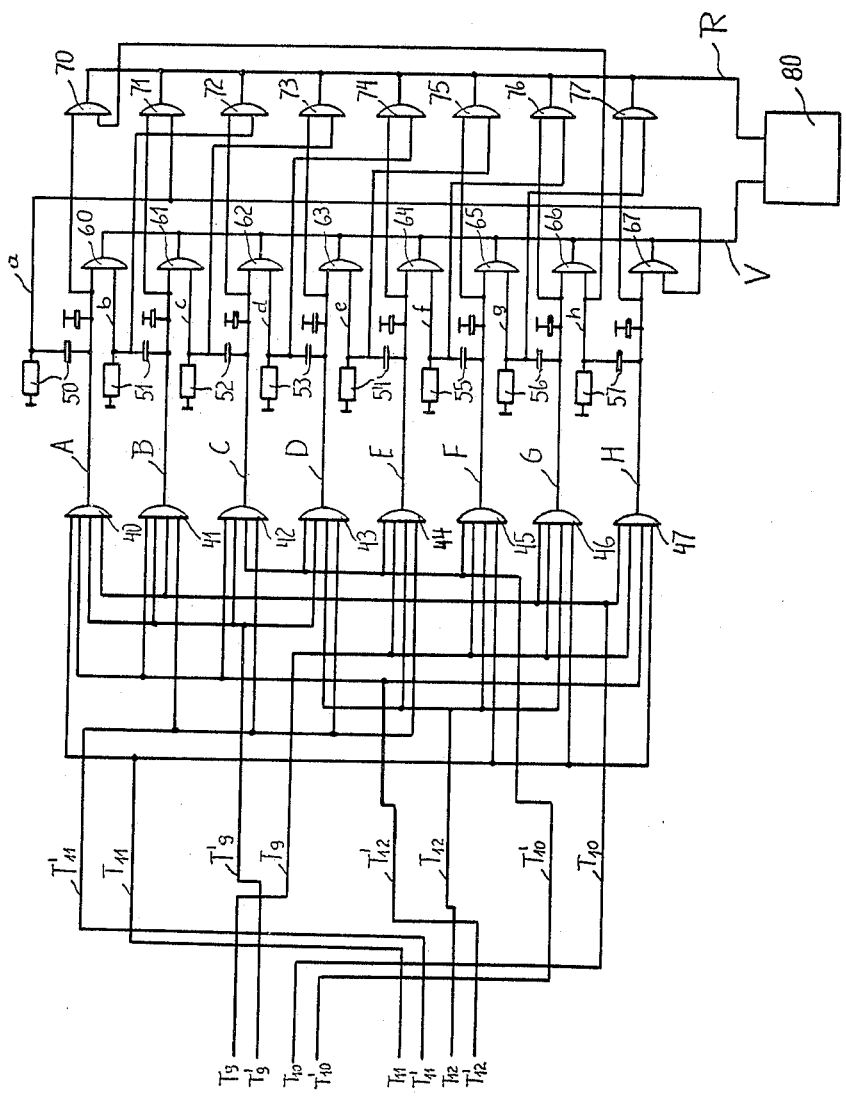
FIG. 5 is a schematic circuit arrangement of the logic network for the exploitation of the impulse rows disclosed in FIG. 4.

The impulse rows $T_9$, $T'_9$, $T_{10}$, $T'_{10}$, $T_{11}$, $T'_{11}$, $T_{12}$ and $T'_{12}$ are, as can be ascertained from FIG. 5, connected to the nor-elements 40, 41, 42, 43, 44, 45, 46 and 47 of a logic circuit. The outputs of the nor-elements 40–47, that is the signal A, B, C, D, E, F, G and H are connected with a logic network, which comprises the and-gates 60–67 and 70–77, which work in accordance with the equation:

$$V_{(forward)} = A \cdot b + B \cdot c + C \cdot d + D \cdot e + E \cdot f + F \cdot g + G \cdot h + H \cdot a$$

$$R_{(backward)} = A \cdot h + B \cdot a + C \cdot b + D \cdot c + E \cdot d + F \cdot e + G \cdot f + H \cdot g$$

whereby by the nor-elements 40 to 47 operate according to the equations $$A = T_9 \cdot T'_{10} \cdot T'_{11} \cdot T_{12}$$
$$B = T_9 \cdot T'_{10} \cdot T_{11} \cdot T_{12}$$
$$C = T_9 \cdot T_{10} \cdot T_{11} \cdot T_{12}$$
$$D = T_9 \cdot T_{10} \cdot T_{11} \cdot T'_{12}$$
$$E = T'_9 \cdot T_{10} \cdot T_{11} \cdot T'_{12}$$
$$F = T'_9 \cdot T_{10} \cdot T'_{11} \cdot T'_{12}$$
$$G = T'_9 \cdot T'_{10} \cdot T'_{11} \cdot T'_{12}$$
$$H = T'_9 \cdot T'_{10} \cdot T'_{11} \cdot T_{12}$$

The values $a$, $b$, $c$, $d$, $e$, $f$, $g$ and $h$ are the derivatives of the corresponding signals A, B, C, D, E, F, G and H and are produced by means of the differentiating members 50–57. The impulses V and R are fed to the counting device 80.

Figure 6:
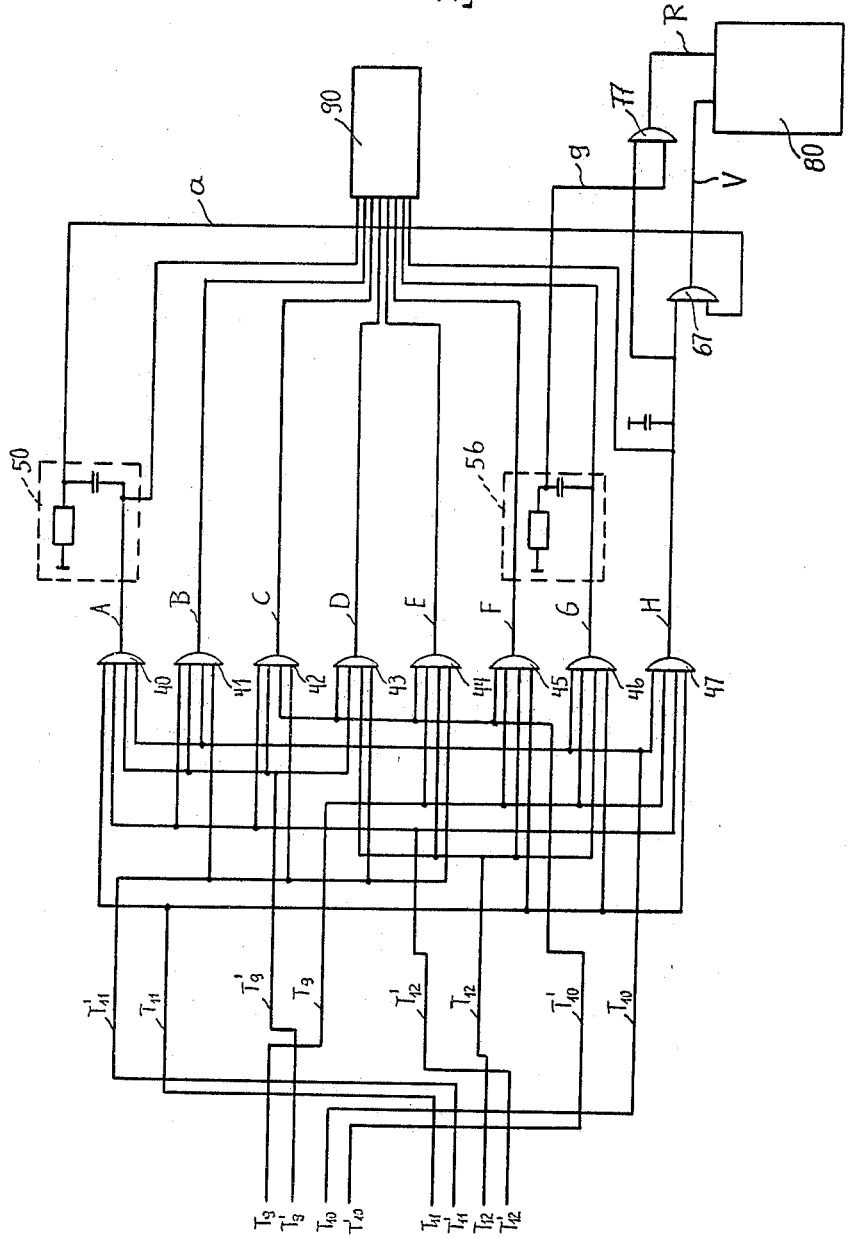
FIG. 6 is another embodiment of the circuit of the logic network for the exploitation of the impulse rows disclosed in FIG. 4.

In FIG. 6 the outputs of the nor-elements 40–47 that is the conduits through which pass signals A, B, C, D, E, F, G and H are connected directly to an indicating device 90, for the indication of the not full-numbered multiples of an interval of the division of the module 15 and of the line plate 16, respectively. The indicating device 90 can be formed, for instance, in form of light signs in form of numbers, which light signs are spatially disposed in series.

The counting of the full-numbered intervals of the division of the module 15 and of the line plate 16, respectively, as well as the indication of the sense of direction, that is the counting "forwardly" and "rearwardly" takes place in the following manner: The impulse A is differentiated in the members 50 and the differential product $a$ is fed with the non-differentiated impulse sequence H to an and-gate 67. During the transfer between the conduits from H to A, a forward impulse is fed to the counting device 80 over the conduit V.

For the rearward counting the impulse G is differentiated in the member 56 and the differential product $g$ is fed with the non-differentiated impulse sequence H to an and-gate 77. During the transfer between the conduits from H to G, a rearward impulse is fed to the counting device 80 over the conduit R.

Referring now again to the drawings, FIG. 7 discloses a possible circuit arrangement to the circuit indicated in principle within the range VII in FIG. 2.

The photo cells 23, 25 and 24, 26, respectively, disposed in counter-phase relative to each other are connected by means of electric conduits 100, 101, and 100', 101', respectively, with potentiometers (adjustable resistances) 102, 103, and 102', 103', respectively, which are switched in turn over an electric conduit 99 and 99', respectively, and are connected with electric conduits 104, 105, 106 and 104', 105', 106', the electric potential of which amounts to, in accordance with the drawing, for instance, +12 v. and −12 v. and 0 v., respectively. Furthermore, the photo cells 23, 25 and 24, 26, respectively, are connected by means of electric conduits 107, 108 and 107', 108', respectively, with the base of a transistor 109 and 109', respectively, the emittor of which is connected with the mentioned electric conduits 106 and 106', respectively, having the electric potential zero, and the collector of the emittor is connected by means of an electric conduit 112 and 112', respectively, and a resistance 114 and 114', respectively, to the mentioned electric conduit 104 and 104', respectively, having the electric potential of +12 v. The electric conduits 108 and 108', respectively, and the electrical conduits 104, 106 and 104', 106', leading from the photo cells 23, 25 and 24, 26 to the base of the transistor 109 and 109', respectively, are also connected together by means of conduits 111, 113, and 111', 113', respectively, and resistances 116, 117 and 116', 117', respectively. The output signals $I_9$ and $I_{10}$ are picked up on the collector of the transistor 109 and 109', respectively, by means of conduits 110 and 110', respectively.

Another transistor 120' is coordinated to the transistor 109', the base of the transistor 120' being connected with the collector of the transistor 109' by means of the electric conduits 110' and 122', and the emittor of the transistor 120' is connected with the mentioned electric conduit 106', having an electric potential zero, by means of the electric conduit 121'. The electric conduits 110' and 122' connecting together the transistors 109' and 120' are connected thereby by means of a conduit 125' and a common resistance 125' with the electric conduit 105' having an electric potential −12 v., while the electric conduit 130' originating from the collector of the transistor 120' is connected with the electric conduit 104', having an electric potential of +12 v., by means of a connecting conduit 131' and a resistance 132'.

The electric conduits 130', 110/137 and 110'/138, respectively, emerging from the collector of the transistors 120', 109 and 109', respectively, are connected to diodes 134, 139 and 140, 141, respectively, which in turn are in connection with resistances 136, 146 and 147, 148, respectively, by means of electric conduits 135, 143 and 144, 145, respectively, and are connected together by means of electric conduits 160 and 161, respectively. Another resistance 150 and 151, respectively, grounded over the conduits 152 and 153, respectively, is switched to the two resistance groups 136, 146 and 147, 148, respectively, and this connection is brought about by means of electric conduits 156 and 155, respectively, which are connected with the electric conduits 160 and 161, respectively, and from which the output signals $I_{11}$ and $I_{12}$ emerge.

The present invention is, as a matter of course, not limited to devices, in which the signals are obtained by light electrical means. With the same advantage, it is also possible to apply the invention in apparatus with, for instance capacitive or inductive signal production.

While I have disclosed several embodiments of the present invention, it is to be understood that these embodiments are given by example only and not in a limiting sense, the scope of the present invention being determined by the objects and the claims.

I claim:

1. A system for measuring of straightaways and divisions of circles, wherein the displacement of a division relative to a reading device for a full numbered or non full-numbered multiple of said division takes place, whereby two impulse row signals are formed set-off for a phase-angle different than 0° and 180° relative to each other, and the size and direction to be measured being determined by impulse counting, comprising:

electrical mean for forming from said two impulse row signals an electrical summary signal, and simultaneously a difference signal, respectively, pulse shaper stage means for receiving said summary and difference signals respectively and for producing output signals having switch jumps, respectively, a direction discriminator means for indicating the direction of said displacement, and a counting circuit, and means for feeding the output signals of said pulse shaper stage means to said direction discriminator means and to said counting circuit.

2. The system, as set forth in claim 1, which includes:

a plurality of photocells adapted to operate as sensing means, said photocells are phase-displaced relative to each other for 90°, the phase difference of signals produced in said photocells is in counter-phase in first and third of said photocells, as well as in second and fourth of said photocells, said two impulse row signals including first impulse row signals formed by means of said first and said third of said photocells, and of said second and said fourth of said photocells, respectively, and second impulse row signals formed by electrical summation and subtraction from said first impulse row signals, respectively, means for feeding said first and said second impulse row signals to said pulse shaper stage means, a logic network means, the output signals of said pulse shaper stage means being connected to said logic network means, and said logic network means for counting the positive as well as the negative switch jumps.

3. The system, as set forth in claim 2, wherein said logic network means includes nor-elements and operates in accordance with the equation $V_{(forward)} = A \cdot b + B \cdot c + C \cdot d + D \cdot e + E \cdot f + F \cdot g + G \cdot h + H \cdot a$ $R_{(rearward)} = A \cdot h + B \cdot a + C \cdot b + D \cdot c + E \cdot d + F \cdot e + G \cdot f + H \cdot g$ wherein said nor-elements of said logic network means operate in accordance with the following equations, $A = T_9 \cdot T'_{10} \cdot T'_{11} \cdot T_{12}$
$B = T_9 \cdot T'_{10} \cdot T'_{11} \cdot T_{12}$
$C = T_9 \cdot T_{10} \cdot T_{11} \cdot T_{12}$
$D = T_9 \cdot T_{10} \cdot T_{11} \cdot T'_{12}$
$E = T'_9 \cdot T_{10} \cdot T_{11} \cdot T'_{12}$
$F = T'_9 \cdot T_{10} \cdot T'_{11} \cdot T'_{12}$
$G = T'_9 \cdot T'_{10} \cdot T'_{11} \cdot T_{12}$
$H = T'_9 \cdot T'_{10} \cdot T'_{11} \cdot T'_{12}$ whereby $T_9$, $T'_9$, $T_{10}$, $T'_{10}$, $T_{11}$, $T'_{11}$, $T_{12}$, $T'_{12}$ are input signals and A, B, C, D, E, F, G, H are exit signals of said nor-elements of said logic network means, and wherein $a$, $b$, $c$, $d$, $e$, $f$, $g$, $h$, constitute derivatives of the signals A, B, C, D, E, F, G, H, respectively.

4. The system as set forth in claim 2, wherein:

said logic network means constitutes in part a direction discriminator circuit including in part a plurality of conduits, and indication means directly connected to said plurality of conduits for indicating fractional multiples of a division of voltage feeding of said plurality of conduits, and a transfer between two predetermined of said plurality of conduits used in said counting.

References Cited

UNITED STATES PATENTS

| | | | |
|---|---|---|---|
| 2,886,718 | 5/1956 | Shepherd et al. | 235—92 |
| 3,371,335 | 2/1968 | Leewald | 235—92 |
| 2,886,717 | 5/1959 | Williamson et al. | |
| 3,142,121 | 7/1964 | Stefanov. | |

MAYNARD R. WILBUR, Primary Examiner

J. GLASSMAN, Assistant Examiner

U.S. Cl. X.R.

235—92; 250—237